US011874177B2

(12) United States Patent
Nakamura et al.

(10) Patent No.: US 11,874,177 B2
(45) Date of Patent: Jan. 16, 2024

(54) IMAGE DISPLAY DEVICE AND IMAGE DISPLAY METHOD

(71) Applicant: Panasonic Intellectual Property Management Co., Ltd., Osaka (JP)

(72) Inventors: Yusaku Nakamura, Osaka (JP); Ryuichi Okamoto, Osaka (JP); Masaki Mukai, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 713 days.

(21) Appl. No.: 17/072,305

(22) Filed: Oct. 16, 2020

(65) Prior Publication Data
US 2021/0033471 A1 Feb. 4, 2021

Related U.S. Application Data

(63) Continuation of application No. PCT/JP2019/016845, filed on Apr. 19, 2019.

(30) Foreign Application Priority Data

Apr. 20, 2018 (JP) ................................. 2018-081701

(51) Int. Cl.
*G01J 5/60* (2006.01)
*G01J 5/02* (2022.01)
(Continued)

(52) U.S. Cl.
CPC .............. *G01J 5/605* (2013.01); *G01J 5/025* (2013.01); *G01J 5/026* (2013.01); *G01J 5/0265* (2013.01);
(Continued)

(58) Field of Classification Search
CPC .. G01J 5/605; G01J 5/025; G01J 5/026; G01J 5/0265; G01J 2005/0077; G01J 2005/0092; H04N 5/33; H04N 7/183
(Continued)

(56) References Cited

U.S. PATENT DOCUMENTS 7,732,768 B1 * 6/2010 Haigh .................. H04N 23/633
250/370.08
9,506,809 B2 * 11/2016 Shin ...................... G01J 5/0265
(Continued)

FOREIGN PATENT DOCUMENTS

CN 104896685 A * 9/2015 .............. F24F 11/30
EP 2690864 A2 1/2014
(Continued)

OTHER PUBLICATIONS

Extended European Search Report corresponding Application No. 19788350.7, dated Dec. 22, 2020.
(Continued)

*Primary Examiner* — Michelle M Iacoletti
*Assistant Examiner* — Noah J. Haney
(74) *Attorney, Agent, or Firm* — Renner, Otto, Boisselle & Sklar, LLP

(57) ABSTRACT

An image display device generates a temperature information image indicating, by a numerical value, a temperature of each pixel contained in a predetermined area including a position on a thermal image specified by a user, and causes a display to display the temperature information image while a temperature of a pixel corresponding to the position specified is displayed at a center of the temperature information image. The image display device sets a temperature range that has a predetermined temperature width and a center which is a temperature of a pixel corresponding to a position the temperature information image specified by the
(Continued)

user, updates the temperature-color conversion information based on the set temperature range, regenerates the thermal image and the temperature information image based on the temperature-color conversion information updated, and causes the display to display the regenerated thermal image and the regenerated temperature information image.

11 Claims, 17 Drawing Sheets

(51) Int. Cl.
*H04N 5/33* (2023.01)
*G01J 5/00* (2022.01)
*H04N 7/18* (2006.01)

(52) U.S. Cl.
CPC ............... *H04N 5/33* (2013.01); *H04N 7/183* (2013.01); *G01J 2005/0077* (2013.01); *G01J 2005/0092* (2013.01)

(58) Field of Classification Search
USPC .......................................................... 356/45
See application file for complete search history.

(56) References Cited

U.S. PATENT DOCUMENTS

| | | | | |
|---|---|---|---|---|
| 10,630,914 | B2* | 4/2020 | Heinke | G01J 5/0859 |
| 10,794,769 | B2* | 10/2020 | Nguyen | G01J 5/0859 |
| 2008/0143338 | A1 | 6/2008 | Sekine | |
| 2009/0008552 | A1 | 1/2009 | Tadano | |
| 2010/0012840 | A1* | 1/2010 | King | G02B 23/12 |
| | | | | 250/330 |
| 2012/0075309 | A1* | 3/2012 | Warnke | G01J 5/025 |
| | | | | 345/441 |
| 2014/0267768 | A1* | 9/2014 | Burleigh | H04N 5/33 |
| | | | | 348/165 |
| 2015/0124102 | A1 | 5/2015 | Frost et al. | |
| 2015/0169169 | A1* | 6/2015 | Andersson | G06F 3/0488 |
| | | | | 715/765 |
| 2016/0112656 | A1* | 4/2016 | Wang | H04N 5/33 |
| | | | | 348/164 |
| 2016/0156858 | A1* | 6/2016 | Lee | H04N 25/674 |
| | | | | 348/241 |
| 2017/0195548 | A1* | 7/2017 | McManus | H04N 23/67 |
| 2018/0316882 | A1* | 11/2018 | Saragaglia | H04N 5/33 |

FOREIGN PATENT DOCUMENTS

| | | | | |
|---|---|---|---|---|
| EP | 3261333 A1 * | 12/2017 | | G01J 5/025 |
| JP | 2001249051 A | 9/2001 | | |
| JP | 2005016991 A | 1/2005 | | |
| JP | 2009-014475 A | 1/2009 | | |
| JP | 2011203897 A | 10/2011 | | |
| JP | 2014-110596 A | 6/2014 | | |
| KR | 20140144597 A * | 6/2013 | | H04N 5/225 |
| WO | 2006/057364 A | 6/2006 | | |

OTHER PUBLICATIONS

International Search Report for related Application No. PCT/JP2019/016845, dated Jun. 11, 2019.

Office Action for corresponding Japanese Application No. 2020-514462 dated Dec. 14, 2021 and its English Translation.

International Preliminary Report on Patentability corresponding Application No. PCT/JP2019/016845, dated Oct. 29, 2020 (English translation).

* cited by examiner

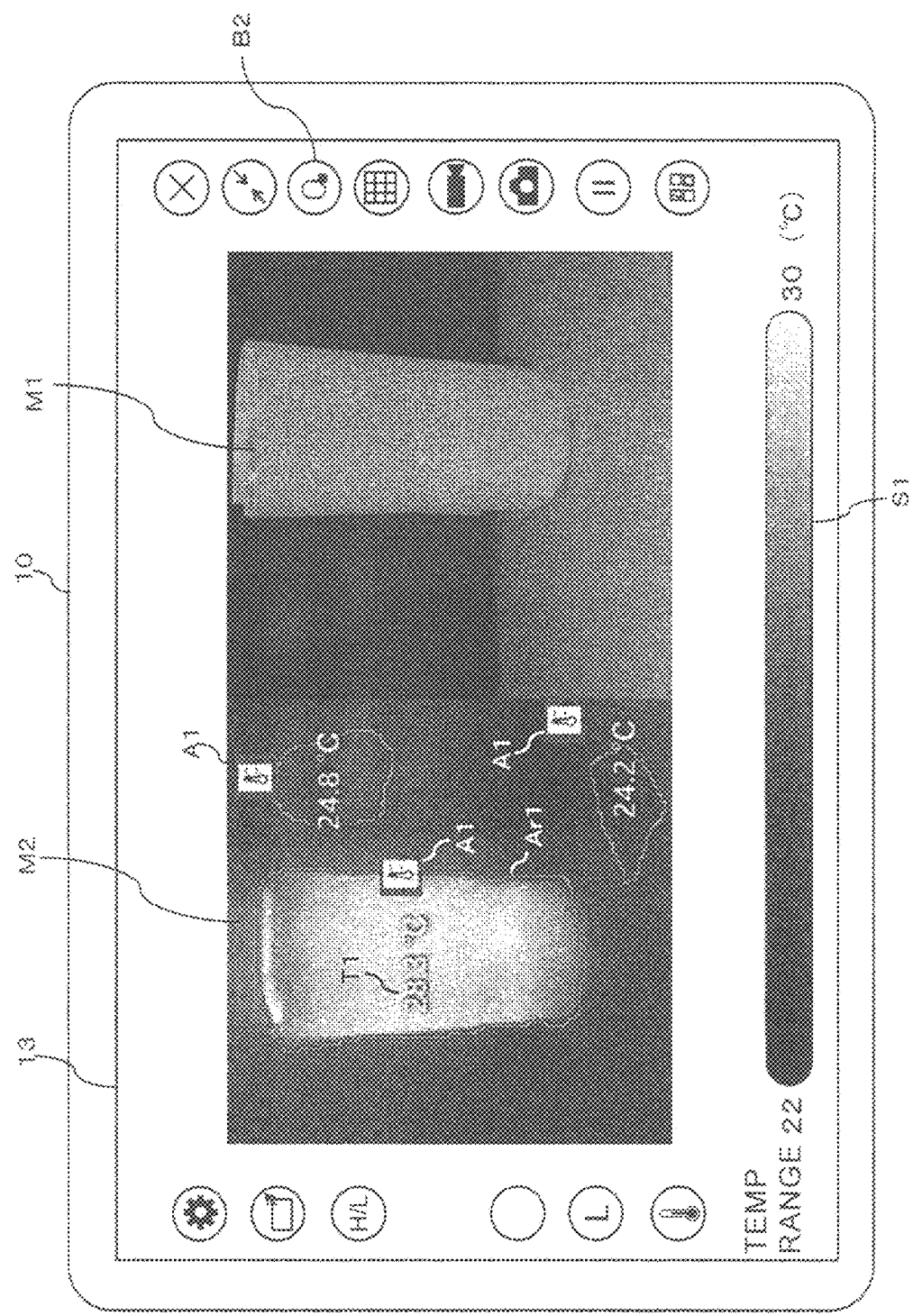

IMAGE DISPLAY DEVICE AND IMAGE DISPLAY METHOD

CROSS-REFERENCE TO RELATED APPLICATION

The present application is a continuation of PCT/JP2019/016845 filed Apr. 19, 2019, which claims priority to Japanese Patent Application No. 2018-081701, filed Apr. 20, 2018, the entire contents of which are incorporated herein by reference.

TECHNICAL FIELD

The present disclosure relates to an image display device that can display a thermal image indicating temperatures of a subject.

BACKGROUND ART

The thermal image is an image used to measure temperatures of an object by using far-infrared light radiated from the object. Because it is possible to know the temperatures of the object from the thermal image, it is possible to specify, from a position apart from the object, a defect part such as a part where there is abnormal heating, a position of water in a pipe, and a position of a cavity inside a wall surface. On the other hand, because it is difficult to specify an actual position only from the thermal image, there is proposed a method in which a thermal image is captured together with a visible image and in which the visible image and the thermal image are both displayed.

JP 2009-14475 A discloses a far-infrared image processing device that performs processing of an image captured by detecting far infrared radiated from an object. The far-infrared image processing device includes: an image signal reception unit that receives an image signal representing a far-infrared image captured by a far-infrared camera; an area specification reception means that receives area specification information specifying a specific area in the far-infrared image; and a resolution converter that generates resolution-converted image information generated by converting a resolution of an amount of far infrared for the specific area, in the far-infrared image, specified by the area specification information. With this configuration, it is possible to convert the resolution of the amount of far infrared in the specific area of particularly high interest in the far-infrared image, so that the resolution of the specific area can be appropriately set while the resolution of the whole image is maintained. This makes it possible to more accurately display a state of the part of particularly high interest in an imaging object and, at the same time, to display an outline of the whole image.

SUMMARY

The present disclosure provides an image display device that enables a user to know temperature information of a heat source easily and intuitively.

In a first aspect of the present disclosure, there is provided an image display device that displays a thermal image that is captured by an infrared camera and indicates temperatures of a subject by color. The image display device includes: a display configured to display a thermal image; a storage configured to store temperature-color conversion information representing a correspondence relation between temperatures of the subject and colors of a pixel; an operation device configured to receive an operation of a user; and a control circuit configured to, according to the operation of the user, generate the thermal image based on the temperature-color conversion information and cause the display to display the thermal image. The control circuit is configured to, when a position on the thermal image is specified by the user, generate a temperature information image indicating, by a numerical value, a temperature of each pixel contained in a predetermined area including the position specified on the thermal image, and cause the display to display the temperature information image while a temperature of a pixel corresponding to the position specified is displayed at a center of the temperature information image. Further, the control circuit is configured to, when a position on the temperature information image is specified by the user, set a temperature range that has a predetermined temperature width and a center which is a temperature of a pixel corresponding to the position specified on the temperature information image, update the temperature-color conversion information based on the temperature range, regenerate the thermal image and the temperature information image based on the temperature-color conversion information updated, and cause the display to display the thermal image and the temperature information image which are regenerated.

In a second aspect of the present disclosure, there is provided an image display method that causes a display device to display a thermal image that indicates temperature information of a subject by color. The image display method generates a thermal image indicating temperatures of the subject by color based on temperature-color conversion information representing a correspondence relation between temperatures of the subject and colors of a pixel, and the image display method displays the thermal image on a display. When a position on the thermal image is specified by a user, the image display method generates a temperature information image that indicates, by a numerical value, a temperature of each pixel contained in a predetermined area containing the position specified on the thermal image, and the image display method displays the temperature information image on the display. At that time, the image display method displays a temperature of a pixel corresponding to the position specified, at a center of the temperature information image. Further, when a position on the temperature information image is specified by the user, the image display method sets a temperature range that has a predetermined temperature width and a center which is a temperature of a pixel corresponding to the position specified on the temperature information image. The image display method updates the temperature-color conversion information based on the temperature range. The image display method regenerates the thermal image and the temperature information image based on the temperature-color conversion information updated, and the image display method displays, on the display, the thermal image and the temperature information image which are regenerated.

BRIEF DESCRIPTION OF THE DRAWINGS

FIG. 18 is a diagram showing an example of the temperature information displayed on the display of the information processing device.

DETAILED DESCRIPTION

In the following, an embodiment will be described in detail with reference to the drawings as appropriate. However, unnecessarily detailed descriptions are omitted in some cases. For example, detailed descriptions of already well-known matters and repetition of descriptions of substantially the same configuration are omitted in some cases. This is to prevent the following description from being unnecessary redundant and to facilitate those skilled in the art to understand the present disclosure. Note that the inventors provide the accompanying drawings and the following description for those skilled in the art to fully understand the present disclosure and that the drawings and the description are not intended to limit the subject matters of the claims.

First Embodiment

[1-1. Configuration]

Figure 1A:
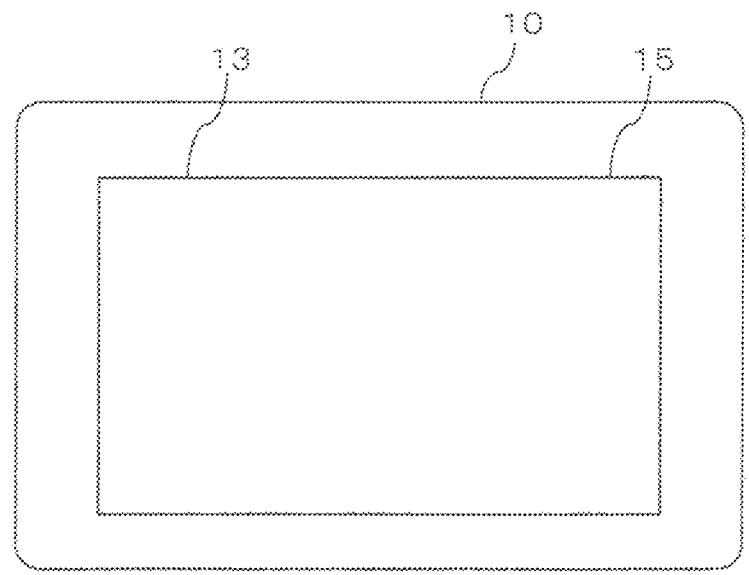
FIG. 1A is a diagram showing an outer appearance of an information processing device of one embodiment of the present disclosure as seen from a front face.
Figure 1B:
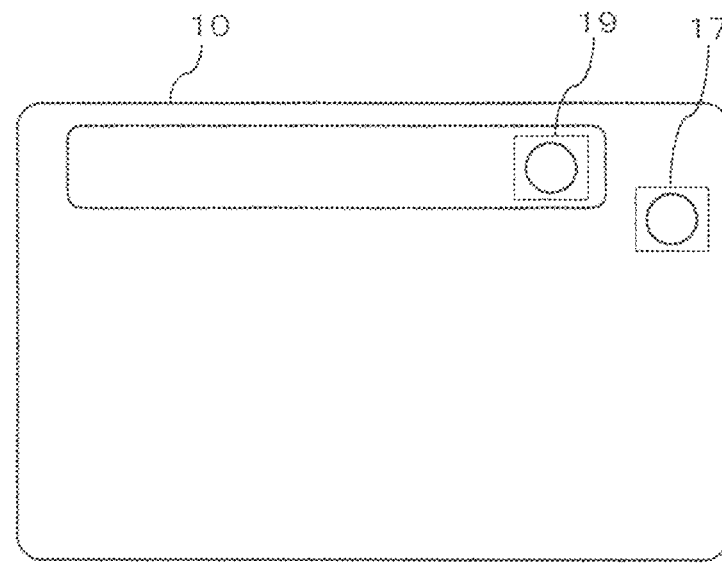
FIG. 1B is a diagram showing an outer appearance of the information processing device of one embodiment of the present disclosure as seen from a rear face.

FIGS. 1A and 1B are diagrams each showing an outer appearance of an information processing device of one embodiment of an image display device of the present disclosure. The information processing device 10 is a so-called tablet terminal. FIG. 1A is a diagram of the information processing device 10 as seen from a front face, and FIG. 1B is a diagram of the information processing device 10 as seen from a rear face. The information processing device 10 includes, on the front face side, a display 13 and a touch panel 15 disposed to be superposed on the display 13. The information processing device 10 includes, on the rear face side, a visible light camera 17 and an infrared camera 19.

Figure 2:
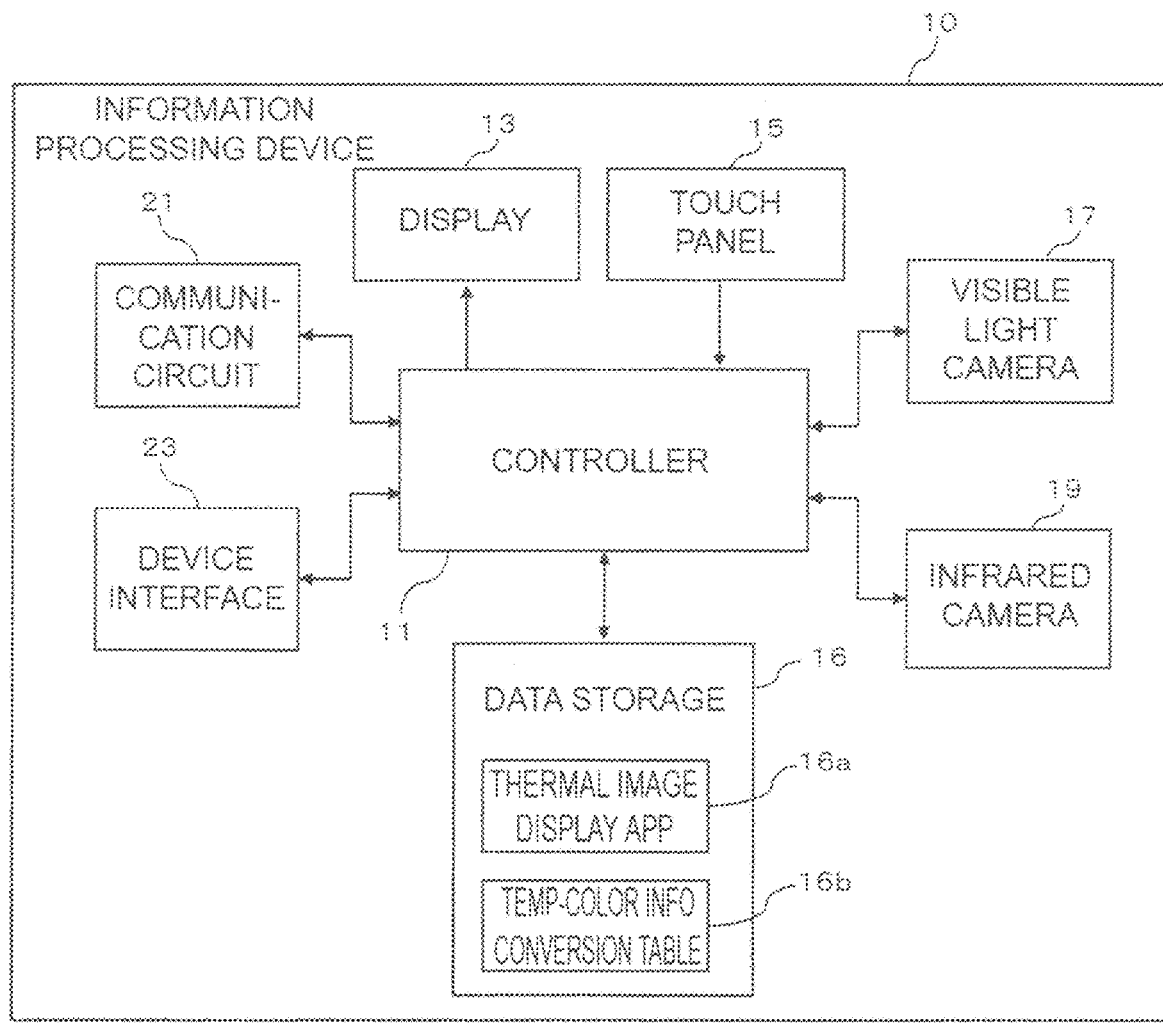
FIG. 2 is a block diagram showing an internal configuration of the information processing device of one embodiment of the present disclosure.

FIG. 2 is a block diagram showing an internal configuration of the information processing device 10. The information processing device 10 includes: a controller 11 configured to control a whole operation of the information processing device 10; the display 13 configured to display various types of information; the touch panel 15 configured to be operated by a user; and a data storage 16 configured to store data and a program. Further, the information processing device 10 includes: a communication circuit 21 configured to connect the information processing device 10 to a network; and a device interface 23 configured to connect an external device to the information processing device 10.

The display 13 is configured with, for example, a liquid crystal display or an organic electroluminescence (EL) display.

The touch panel 15 is an input device configured to detect a touch operation with a finger of a user or a stylus pen. The touch panel 15 is disposed such that an operation area of the touch panel 15 is superposed on a display area of the display 13. Instead of or in addition to the touch panel 15, the information processing device 10 may include, as an operation device, other operation members such as a button and a slide switch physically provided on the information processing device 10. The information processing device 10 can display an image on the display 13 while changing (shrinking or expanding) a display magnification of the image, depending on a user operation (pinch-in operation or pinch-out operation) on the touch panel 15.

The communication circuit 21 is a circuit (module) to make connection with a network and perform communications in accordance with a communication standard such as 3G, 4G, LTE, or WiMAX (registered trade mark). The device interface 23 is a circuit (module) to make connection with an external device and perform communications in accordance with a communication standard such as USB (registered trade mark), HDMI (registered trade mark), or Bluetooth (registered trade mark).

The data storage 16 is a non-transitory recording medium to store a parameter, data, a control program, and other information necessary to realize a predetermined function. The data storage 16 stores a thermal image display application 16a (control program) and a temperature-color information conversion table 16b for realizing functions of the information processing device 10 to be described below. The data storage 16 is configured with, for example, a hard disk drive (HDD), a semiconductor storage device (SSD), or a semiconductor memory (RAM). The temperature-color information conversion table 16b is a reference table in which temperatures of pixels of a thermal image generated by the infrared camera 19 and colors of pixels are correlated to each other.

The visible light camera 17 is an imaging device that has sensitivity in a visible light wavelength region and is configured to capture visible light from a subject at a predetermined frame rate to generate an image (hereinafter, referred to as a "visible image"). The infrared camera 19 is an imaging device that has sensitivity in an infrared wavelength region and is configured to capture infrared from a subject at a predetermined frame rate to generate an image (hereinafter, referred to as an "infrared image") including each pixel containing information indicating a temperature of the subject. The visible light camera 17 and the infrared camera 19 have almost the same angle of view and are disposed to take images of almost the same subject.

The controller 11 includes a central processing unit (CPU) and realizes a function of the information processing device 10 to be described below by executing a control program. Note that the controller 11 may be realized only by a hardware circuit designed exclusively to realize a predetermined function. Other than a CPU, the controller 11 can be configured with various circuits such a micro processing unit (MPU), a graphics processing unit (GPU), a digital signal processor (DSP), a field programmable gate array (FPGA), and an application specific integrated circuit (ASIC).

In the present embodiment, the information processing device 10 is an example of the image display device. The controller 11 is an example of the control circuit. The data storage 16 is an example of the storage. The touch panel 15 is an example of the operation device. A temperature information window WD is an example of the temperature information image. The visible light camera 17 is an example of a first camera. The infrared camera 19 is an example of a second camera.

[1-2. Operation]

An operation of the information processing device 10 configured as described above will be described below.

The information processing device 10 of the present embodiment has a function to display, simultaneously on the display 13, a thermal image based on an infrared image captured by the infrared camera 19 and a visible image captured by the visible light camera 17. Further, the information processing device 10 displays a temperature information window displaying, by a numerical value, a temperature of the subject regarding a partial area which is part of the thermal image and is specified by a user. These functions are realized by the thermal image display application 16a.

Figure 3:
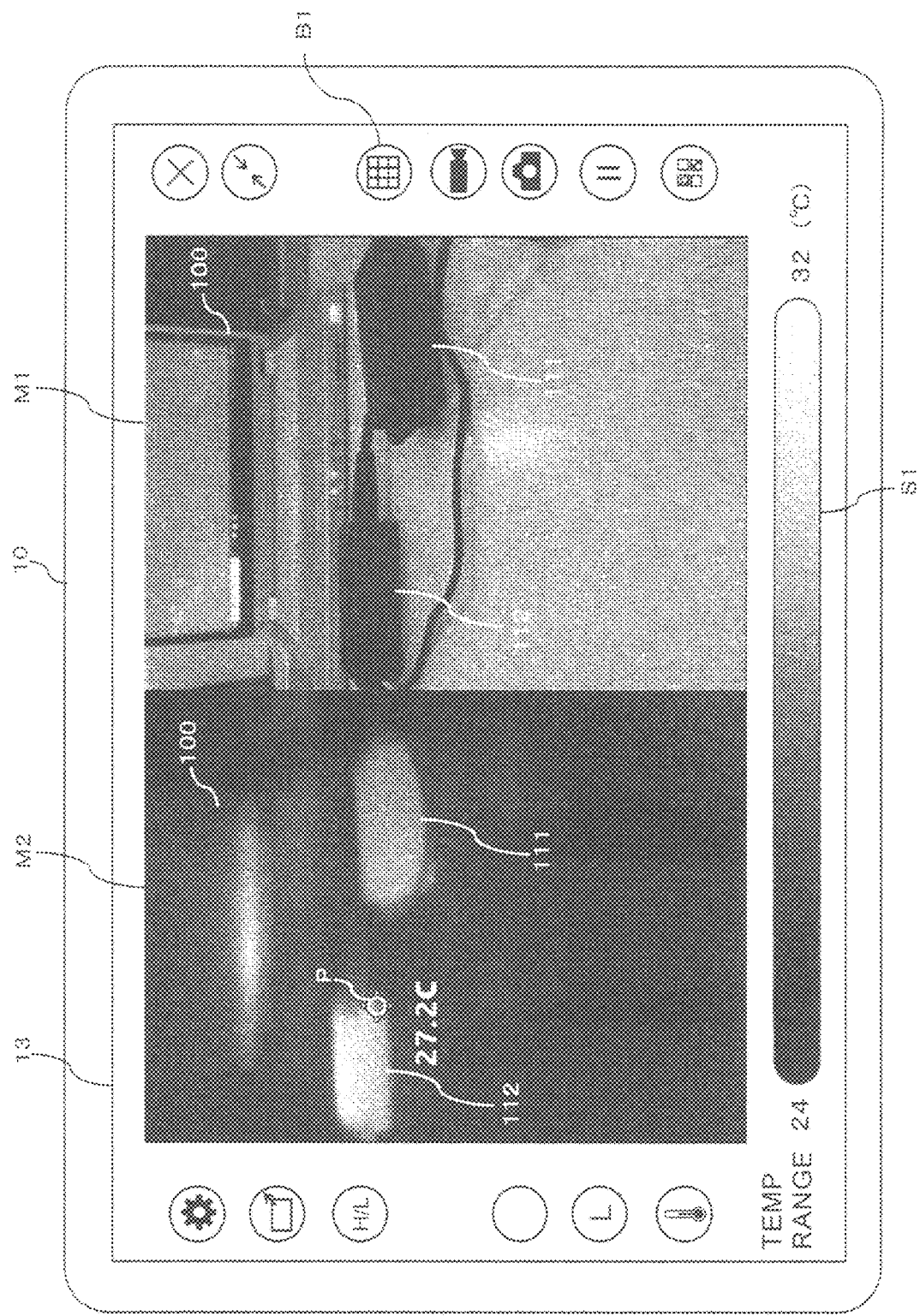
FIG. 3 is a diagram showing a preview image displayed on a display of the information processing device.

FIG. 3 is a diagram showing a preview image displayed on the display 13 of the information processing device 10. As shown in FIG. 3, on the display 13, a visible image M1 captured by the visible light camera 17 and a thermal image M2 captured by the infrared camera 19 are displayed side by side. The thermal image M2 is an image in which a color of each pixel in the infrared image is set based on a temperature and which shows a temperature distribution of the subject. In the visible image M1 and the thermal image M2, a laptop personal computer 100 and two power supply adaptors 111 and 112 are displayed as the subjects.

There are disposed various operation buttons beside the visible image M1 and the thermal image M2. A button B1 is a temperature information display button to switch a mode to a temperature information display mode in which the temperature information window (to be described below in detail) is displayed. Below the visible image M1 and the thermal image M2, there is displayed an indicator S1 that shows a correspondence relation between colors of the thermal image M2 and temperatures.

Further, on the thermal image M2 there is displayed a pointer P. In the vicinity of the pointer P, there is displayed "27.2° C." that is a temperature of a pixel specified by the pointer P. The pointer P specifies a pixel at a center of the temperature information window to be described below. The position of the pointer P can be arbitrarily changed on the thermal image M2 by a touch operation or a drag operation by the user.

The visible light camera 17 and the infrared camera 19 have approximately the same angle of view and capture images of approximately the same subject. This enables the user to recognize a temperature distribution of the subject by the thermal image M2 while seeing the subject on the visible image M1.

[1-2-1. Temperature Information Window]

Figure 4:
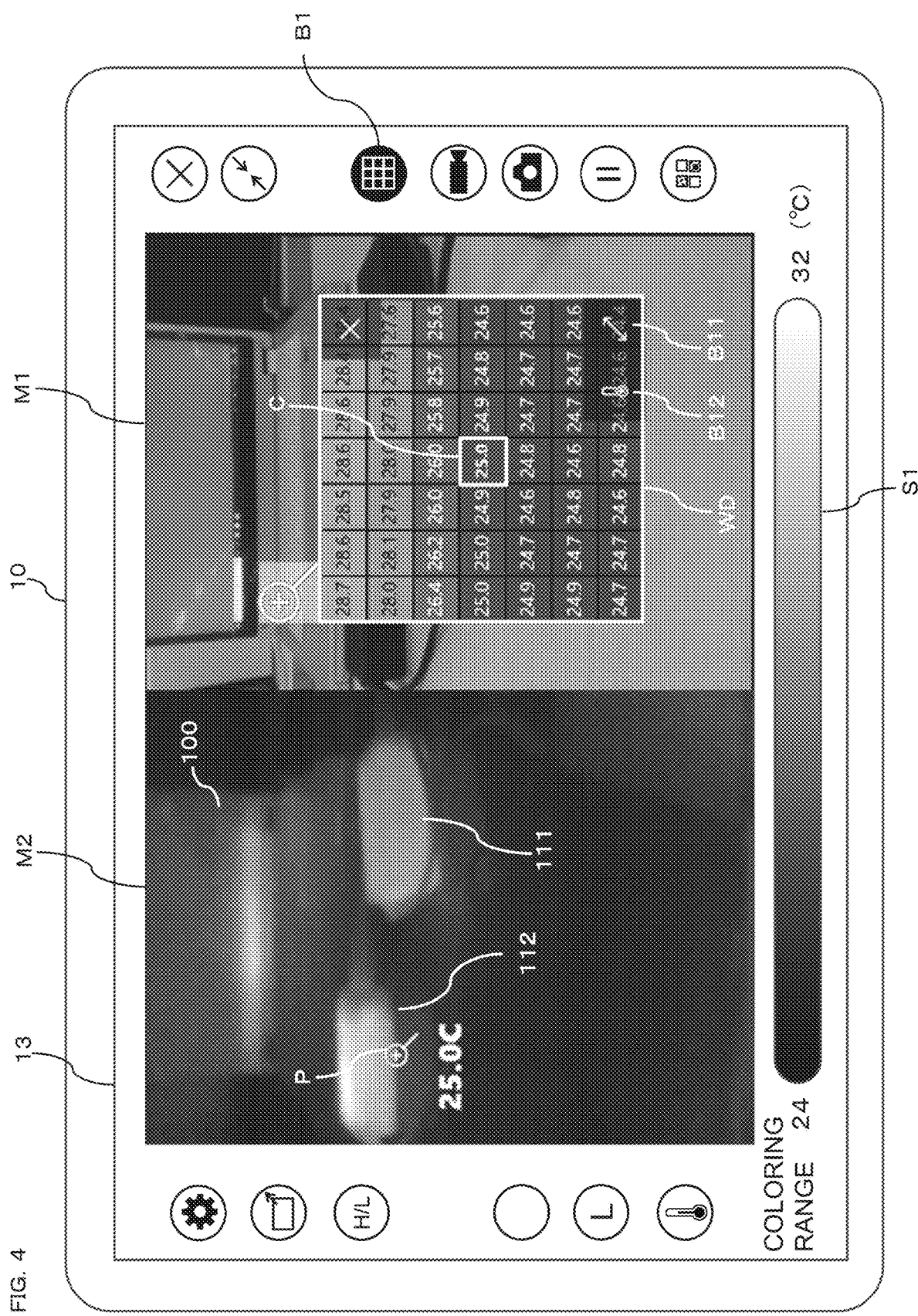
FIG. 4 is a diagram showing an example of a temperature information window displayed on the display of the information processing device.

When the temperature information display button B1 is pressed on the screen of FIG. 3 by a user, the information processing device 10 is switched to the temperature information display mode. As shown in FIG. 4, in the temperature information display mode, the temperature information window WD, in which temperatures of pixels are displayed in numerical values, is displayed to be superposed on the visible image M1.

The temperature information window WD is an image that displays, in numerical values, the temperatures of the pixels in a region corresponding to a predetermined area (M×N pixels) including the position specified by the pointer P on the thermal image M2. The temperature information window WD has rectangular areas that are two-dimensionally arranged in correspondence to the pixels of the predetermined area on the thermal image M2. In each rectangular area, there is disposed a numerical value indicating a temperature of a corresponding pixel, of the thermal image M2, corresponding to the rectangular area. Further, background colors of individual rectangular area are set depending on temperatures of pixels corresponding to the individual rectangular areas, based on the temperature-color information conversion table 16b.

For example, in FIG. 4, the temperature information window WD displays temperatures of 7×7 pixels centered at a pixel corresponding to the position specified by the pointer P on the thermal image M2. At the center C of the temperature information window WD, there is displayed the temperature (25.0° C.) of the pixel at the position specified by the pointer P.

Figure 5:
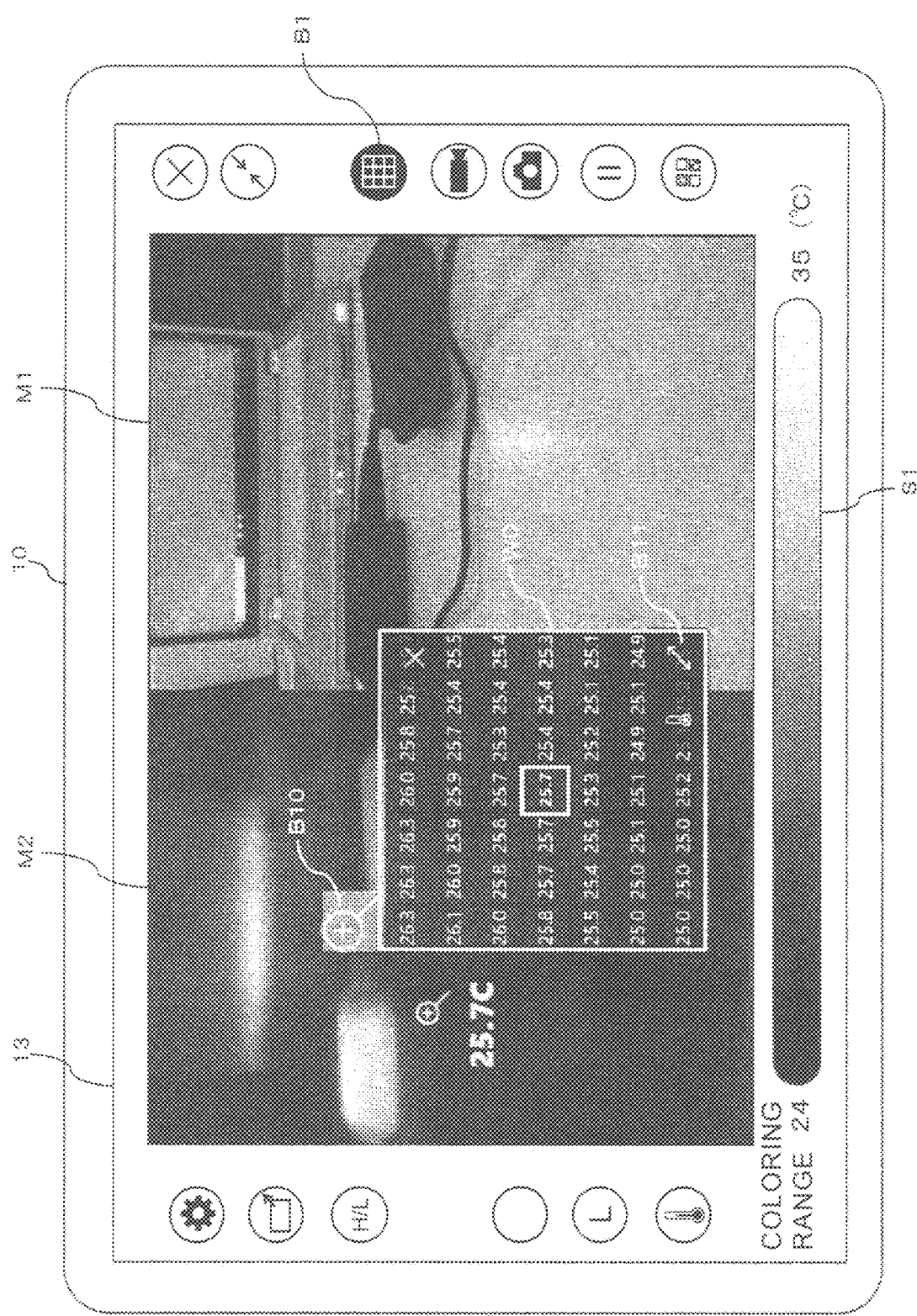
FIG. 5 is a diagram illustrating movement of the temperature information window.

The aforementioned temperature information window WD can be freely moved as shown in FIG. 5 in accordance with a user operation, for example, in accordance with a drag operation of a button B10.

Figure 6:
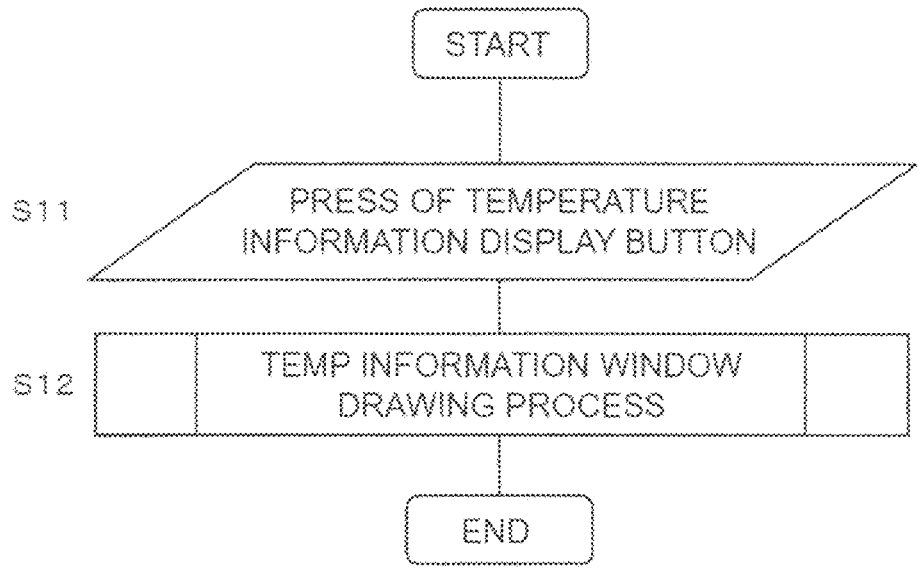
FIG. 6 is a flowchart showing a switching process to a temperature information display mode.

FIG. 6 is a flowchart showing a display process of the temperature information window in the information processing device 10. This process is performed by the controller 11 of the information processing device 10.

The controller 11 determines whether the temperature information display button B1 is pressed by a user (step S11). When determining that the temperature information display button B1 is pressed, the controller 11 switches the operation mode of the information processing device 10 to the temperature information display mode. Then, the controller 11 performs a temperature information window drawing process (step S12). In the temperature information window drawing process, the temperature information window WD is generated by using the position of the pointer P on the thermal image M2 as a reference.

Figure 7:
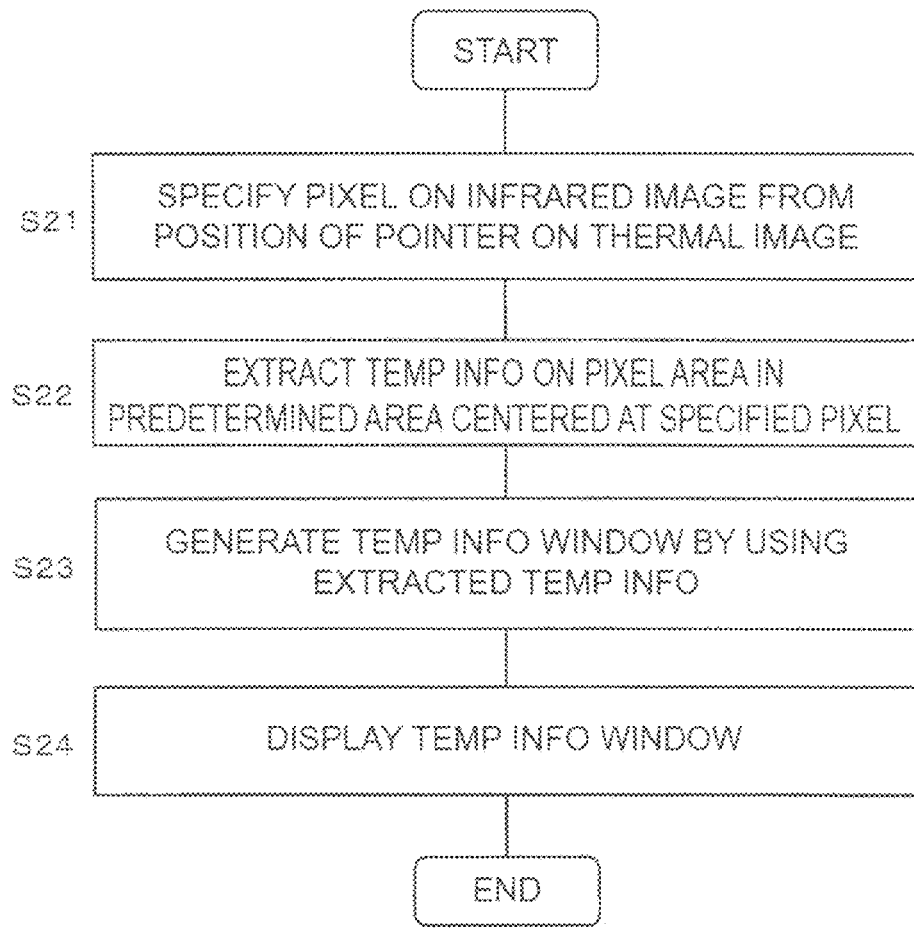
FIG. 7 is a flowchart showing a drawing process of the temperature information window.

In the following, the temperature information window drawing process (step S12) will be described in detail with reference to the flowchart of FIG. 7.

The controller 11 specifies a pixel on the thermal image M2 from the position of the pointer P on the thermal image M2 (step S21). The controller 11 extracts temperature information on a pixel area in a predetermined area centered at the specified pixel (step S22). Here, the predetermined area is an area of 7×7 pixels centered at a pixel corresponding to the position of the pointer P.

The controller 11 generates the temperature information window by using the extracted temperature information for the 7×7 pixels (step S23). Specifically, the controller 11 generates a window having rectangular areas disposed corresponding to the 7×7 pixels and disposes in each rectangular area a numerical value (character string) representing a temperature of a corresponding pixel. Further, the controller 11 sets a background color of each rectangular area to a color corresponding to a value of a temperature disposed in a corresponding rectangular area.

Then, the controller 11 displays the generated temperature information window on the display 13 (step S24).

As described above, in the temperature information display mode, the temperature information window WD, in which the temperature information is displayed by numerical values, is displayed on the display 13 on the basis of the position of the pointer P specified by the user. After this operation, when the position of the pointer P is changed, contents of the temperature information window WD are also changed.

Figure 8A:
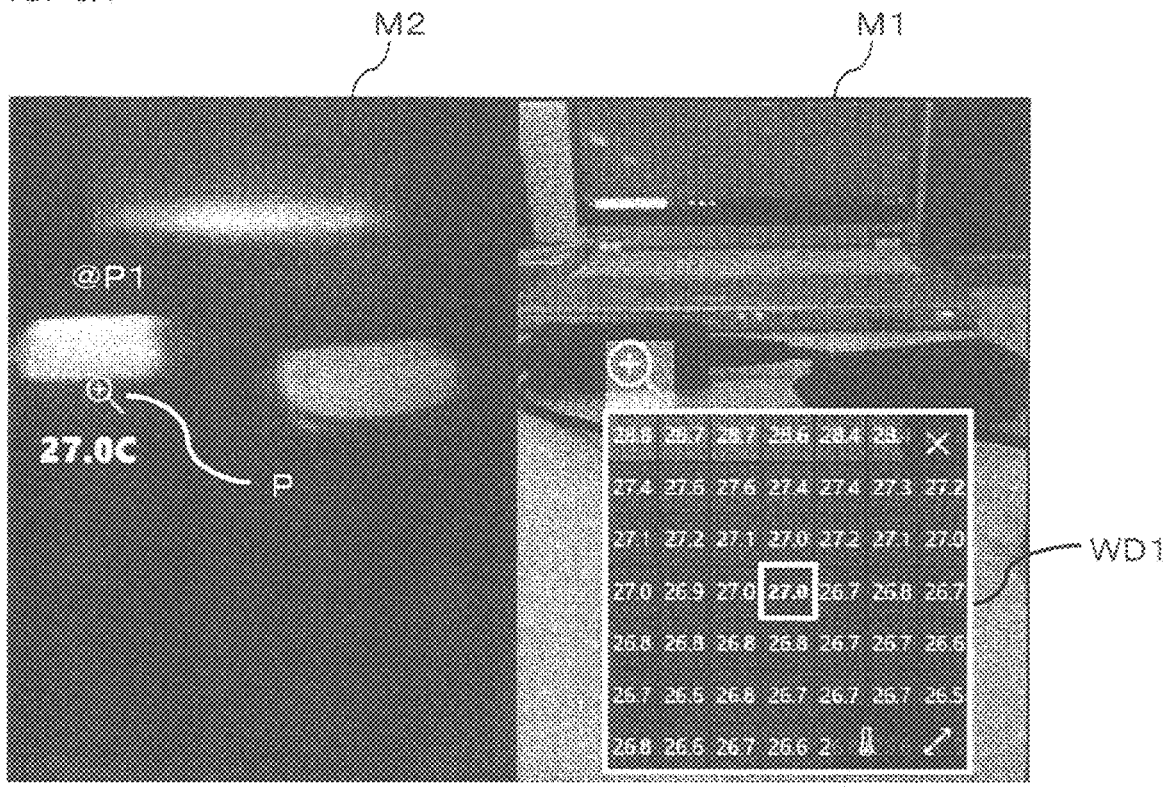
FIG. 8A is a diagram illustrating the temperature information window representing a display content before movement of a pointer on a thermal image.
Figure 8B:
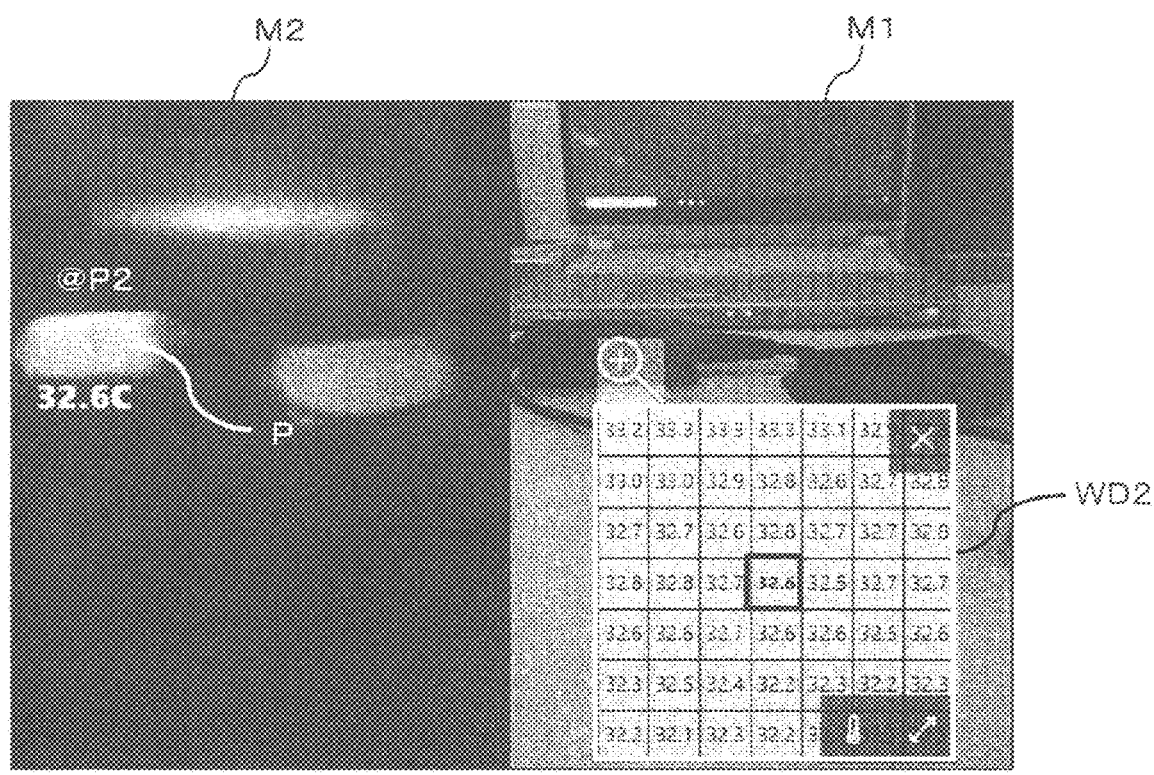
FIG. 8B is a diagram illustrating the temperature information window representing a display content changed after movement of the pointer on the thermal image.

The temperature information window WD displays temperatures in the predetermined area (7×7 pixels) including the position specified on the thermal image M2 by the pointer P. FIGS. 8A and 8B are diagrams for illustrating that the contents of the temperature information window are changed in association with movement of the pointer P on the thermal image M2. Initially, as shown in FIG. 8A, when the pointer P is at a position P1, a temperature information window WD1 displays, by numerical values, temperatures in an area of 7×7 pixels centered at a pixel corresponding to the position P1. In this case, in a rectangular area at the center of the temperature information window WD1, a numerical value of 27.0° C., which represents a temperature at the position P1, is displayed; and a background color of the rectangular area is set to a color corresponding to the temperature 27.0° C. In the other rectangular areas, numerical values representing the respective temperatures are displayed, and the background colors are set to colors corresponding to the respective temperatures.

After that, when the pointer P is moved to a position P2 from the position P1, the display contents of the temperature information window are changed in association with the movement of the pointer P as shown in the temperature information window WD2 of FIG. 8B. Specifically, in this case, in a rectangular area C at the center of the temperature information window WD2, a numerical value of 32.6° C., which represents a temperature at the position P2, is displayed; and the background color of the rectangular area is set to the color corresponding to the temperature 32.6° C. In the other rectangular areas, numerical values representing the respective temperatures are displayed, and the background colors are set to the colors corresponding to the respective temperatures.

Since the temperature information window WD displays the temperatures in the predetermined area using the position of the pointer P on the thermal image M2 as a reference, the display contents of the temperature information window WD are changed in association with the movement of pointer P.

Figure 9:
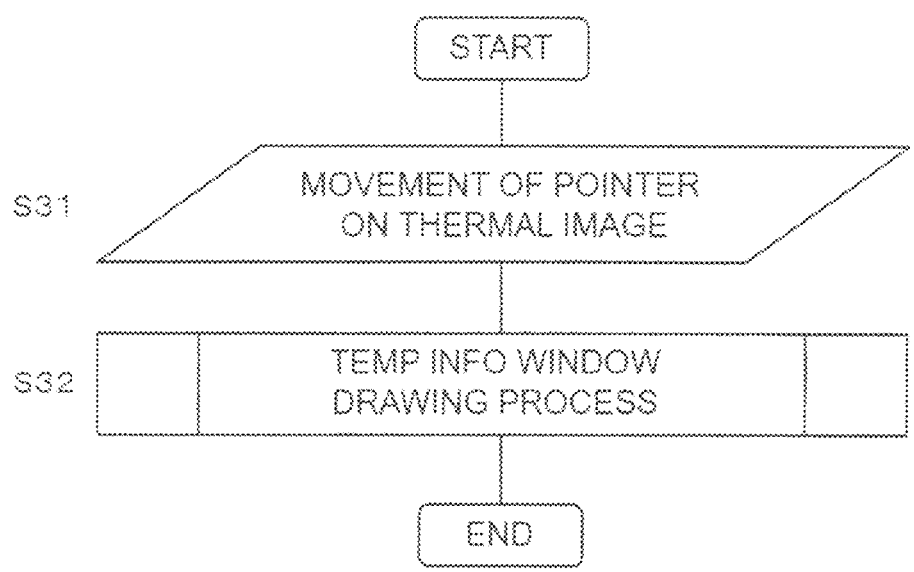
FIG. 9 is a flowchart showing a redrawing process of the temperature information window when the pointer is moved on the thermal image.

FIG. 9 is a flowchart showing a redrawing process of the temperature information window WD when the pointer P is moved on the thermal image M2 in the temperature information display mode. The pointer P is moved by the user by touching one point on the thermal image M2 or the drag operation of the pointer P.

The controller 11 determines whether the pointer P is moved on the thermal image M2 (step S31). When the controller 11 has detected the movement of the pointer P on the thermal image M2, the controller 11 performs a drawing process of the temperature information window on the basis of a new position of the pointer P (step S32).

Figure 10:
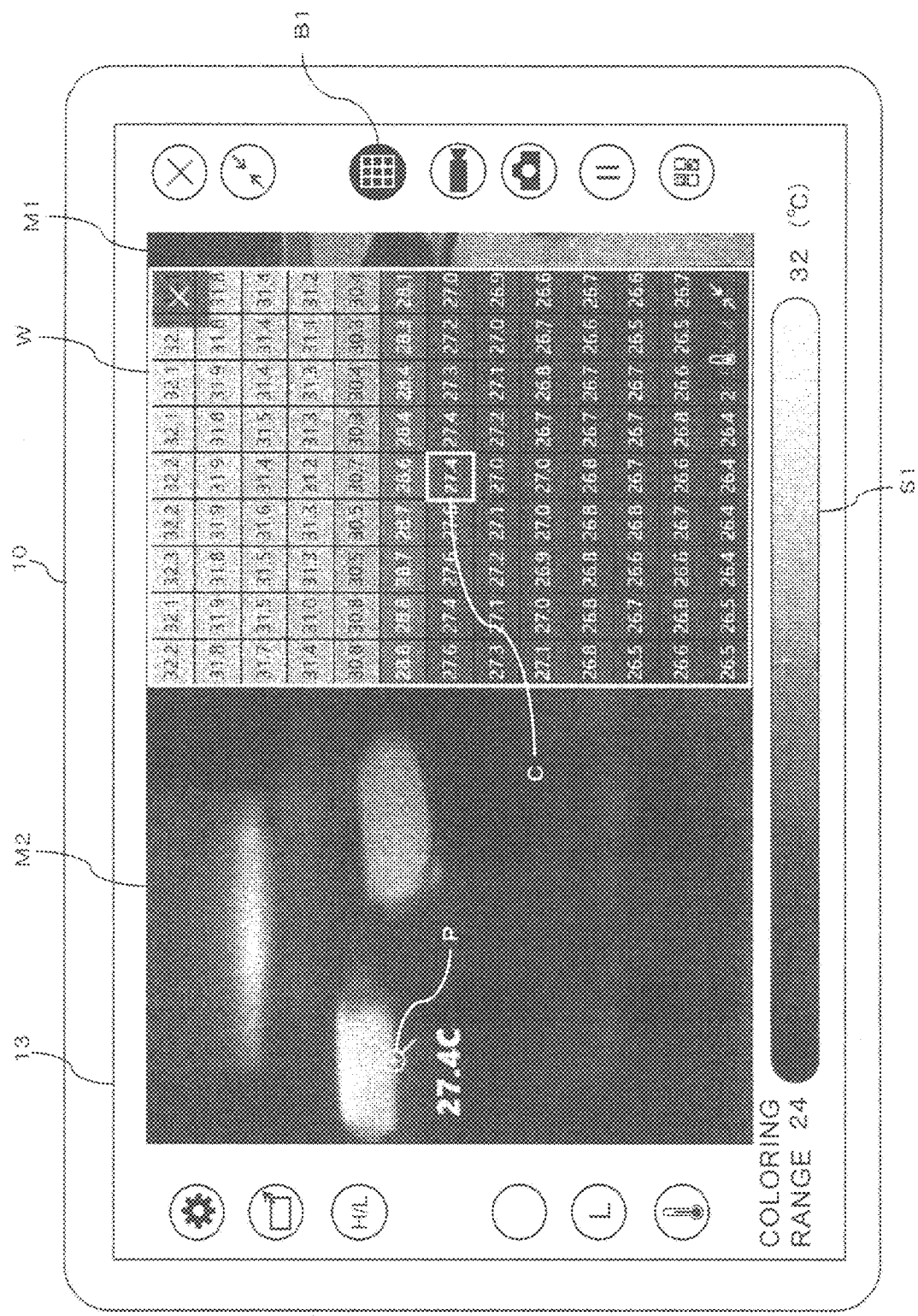
FIG. 10 is a diagram illustrating the temperature information window displayed in a maximized size.

FIG. 10 is a diagram illustrating the temperature information window WD displayed in a maximized size. When a maximize button B11 is pressed in the temperature information window WD as shown in FIG. 4, the temperature information window WD can be displayed in the maximized size as shown in FIG. 10. In the example of FIG. 10, the temperature information window WD displays temperatures of an area of 9×13 pixels centered at the pixel corresponding to the position of the pointer P.

Figure 11:
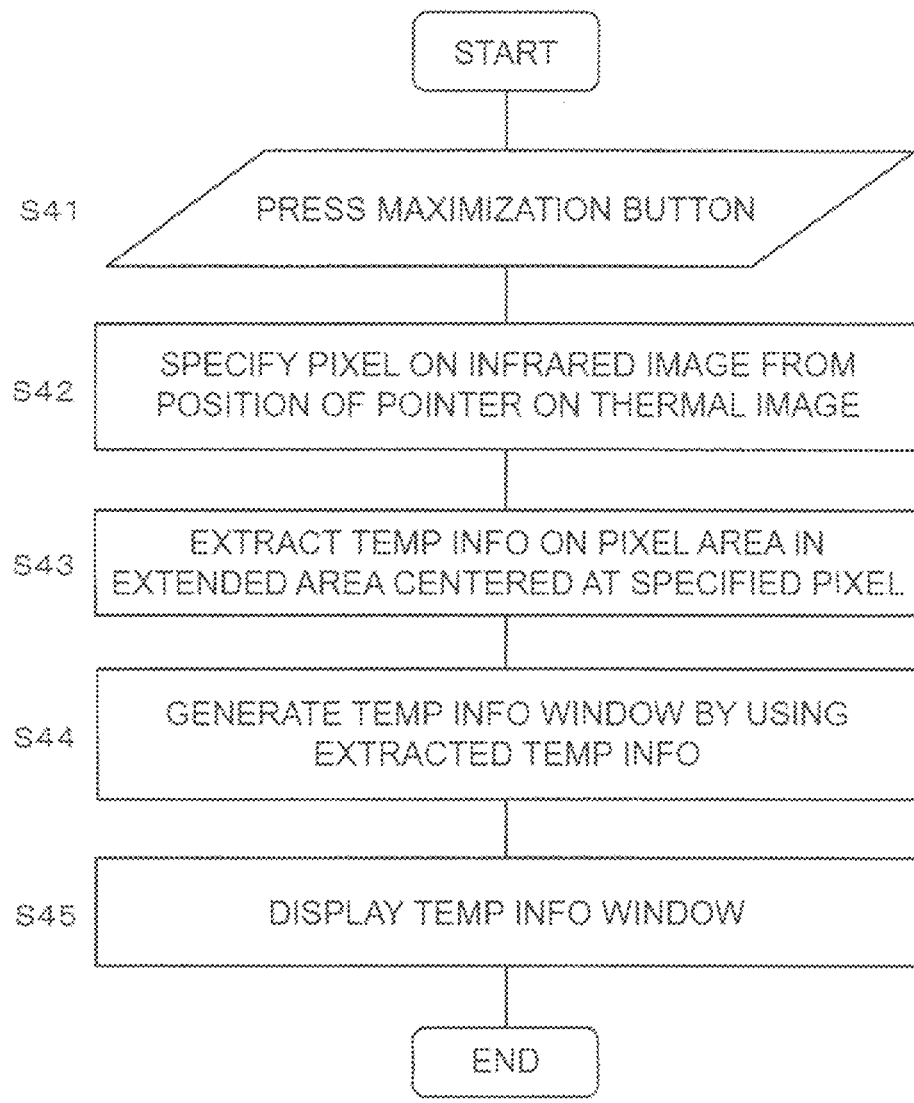
FIG. 11 is a flowchart showing a maximization display process of the temperature information window.

FIG. 11 is a flowchart showing a maximization display process of the temperature information window WD. The controller 11 determines whether the maximize button B1 is pressed (step S41). When determining that the maximize button B11 is pressed, the controller 11 specifies a pixel on the infrared image from the position of the pointer P on the thermal image M2 (step S42). The controller 11 extracts the temperature information of the pixel area in an extended range centered at the specified pixel (step S43). The extended range is, for example, an area of 9×13 pixels centered at the pixel corresponding to the position of the pointer P.

The controller 11 generates a maximized temperature information window by using the extracted temperature information (step S44). Then, the controller 11 displays the maximized temperature information window on the display 13 (step S45).

[1-2-2. Coloring Temperature Range in Thermal Image]

The thermal image M2 is an image that indicates temperatures of a subject by color. In the following, a correspondence relation between colors of pixels displayed on the thermal image M2 and temperatures represented by the pixels.

Each of pixels constituting the thermal image M2 has information representing a temperature of the subject. The thermal image M2 is an image displayed in such a manner that the temperature information of each pixel is converted into a corresponding color.

Figure 12:
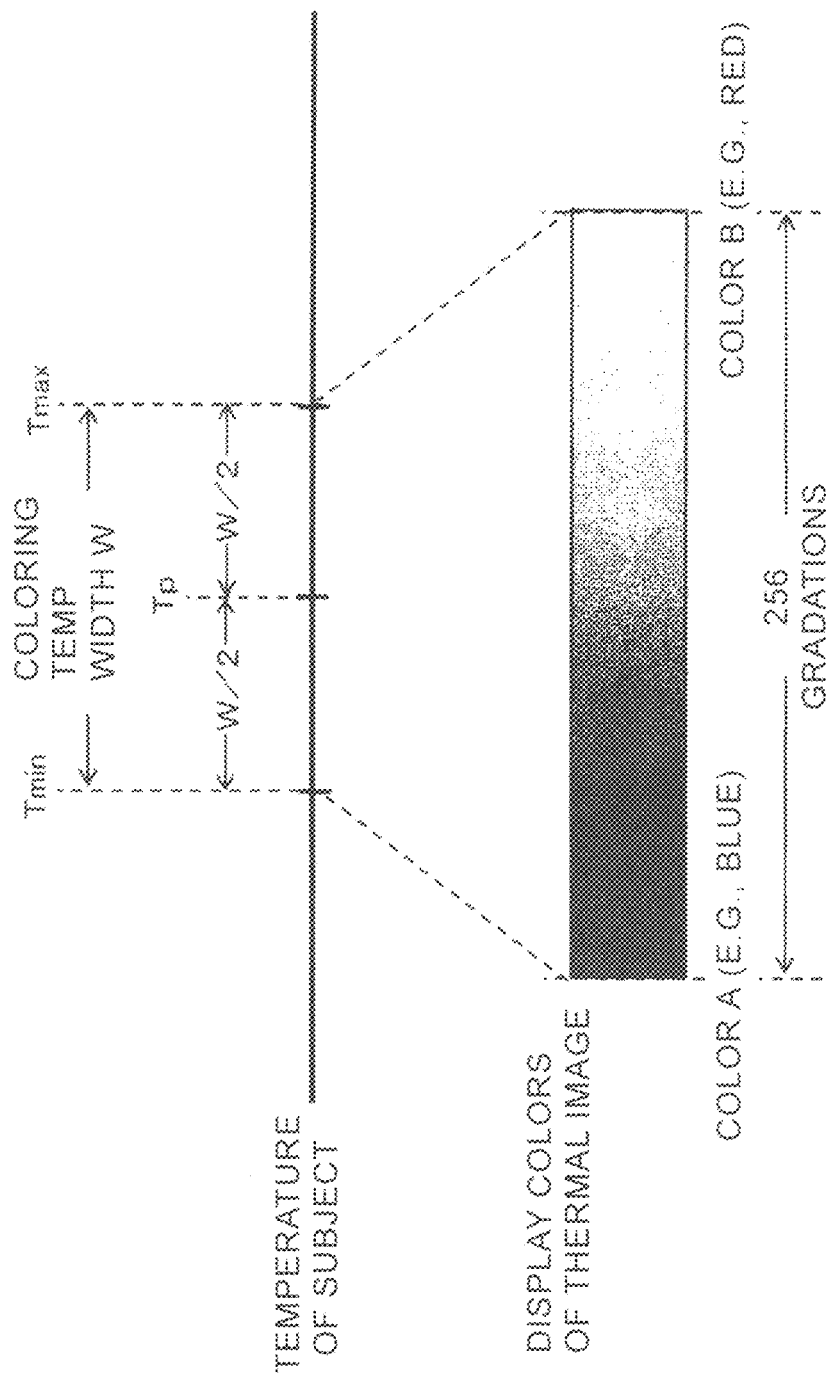
FIG. 12 is a diagram illustrating a correspondence relation between temperatures and display colors.

FIG. 12 is a diagram illustrating the correspondence relation between colors used for display in the thermal image M2 and temperatures. In the thermal image M2, pixels in a prescribed range (hereinafter, referred to as a "coloring temperature range") are colored in colors corresponding to temperatures of the pixels. When a temperature of a pixel successively changes from a lower limit value Tmin to an upper limit value Tmax of the coloring temperature range, a color of the pixel is also successively changed depending on the temperature from a color A corresponding to the lower limit value Tmin to a color B corresponding to the upper limit value Tmax. At this time, the color of the pixel is changed in 256 steps. The color A corresponding to the lower limit value Tmin of the coloring temperature range is blue, for example; and the color B corresponding to the upper limit value Tmax of the coloring temperature range is red, for example.

Note that, when a temperature of a pixel is lower than the lower limit value Tmin or higher than the upper limit value Tmax, the pixel does not have to be colored. Alternatively, while a temperature of a pixel is lower than the lower limit value Tmin, a color of the pixel may be fixed to the color A corresponding to the lower limit value Tmin. While a temperature of a pixel is higher than the upper limit value Tmax, a color of the pixel may be fixed to the color B corresponding to the upper limit value Tmax.

A width W of the coloring temperature range is set by the user (to be described later in detail). Once the width W of the coloring temperature range is set, a value of the width W is stored in the data storage 16 until the value is changed, and the value is referred to when the thermal image M2 is generated.

The lower limit value Tmin and the upper limit value Tmax of the coloring temperature range are set by the following equations on the basis of a temperature Tp of the pixel corresponding to the position of the pointer P and the width W of the coloring temperature range.

Lower limit value $T$min of coloring temperature range=$Tp-W/2$ (Equation 1a)

Upper limit value $T$max of coloring temperature range=$Tp+W/2$ (Equation 1b)

That is, in the thermal image M2, pixels having temperatures within a range of ±W/2 of the temperature Tp of the pixel corresponding to the position of the pointer P are colored and displayed.

In the information processing device 10 of the present embodiment, the user can arbitrarily set the width W of the coloring temperature range in steps of a predetermined temperature (for example, in steps of 1° C.). A setting method of the width W of the coloring temperature range will be described later.

[1-2-2-1. Setting of Coloring Temperature Range]

If a temperature difference between parts to be compared, of the subject is small, the temperature difference is difficult to visually recognize on the thermal image M2 in some cases. For example, as the example shown in FIG. 13, a temperature difference between the power supply adaptor 111 and the power supply adaptor 112 is small and therefore it is difficult to visually recognize the temperature difference between the power supply adaptor 111 and the power supply adaptor 112. To address this issue, the information processing device 10 of the present embodiment has a function to change the width of the coloring temperature range.

Figure 13:
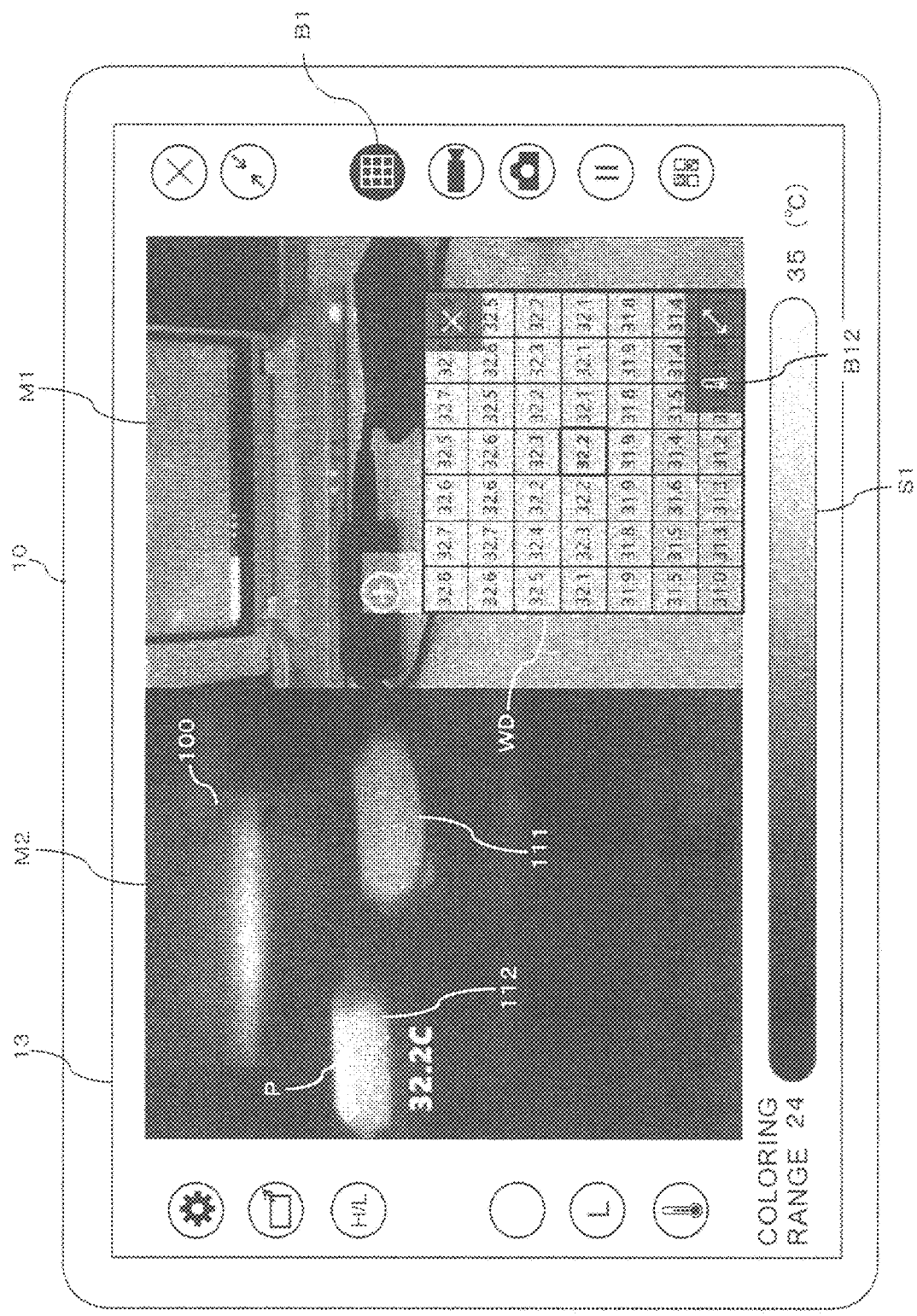
FIG. 13 is a diagram for describing a problem of visibility on a thermal image
Figure 14:
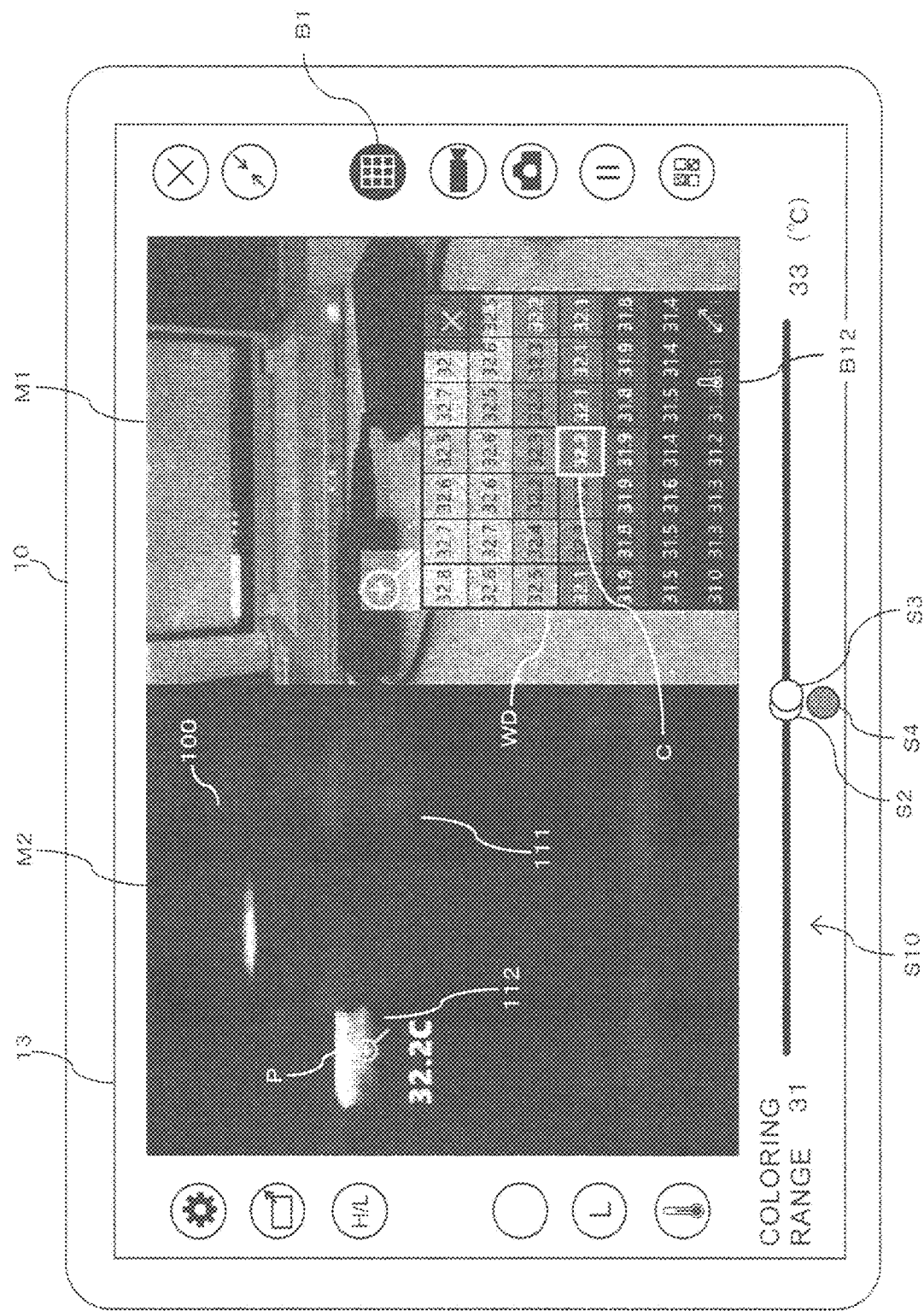
FIG. 14 is a diagram illustrating a thermal image in which visibility is improved by changing a coloring temperature width.

That is, in the example of FIG. 13, the width of the coloring temperature range is set to 11° C. (=35° C. to 24° C.). In contrast, as shown in FIG. 14, the width of the coloring temperature range can be changed to 2° C. (=33° C. to 31° C.), which is narrower than before. In the example of FIG. 13, it is difficult to visually distinguish the temperature difference (difference in color) between the power supply adaptor 111 and the power supply adaptor 112. In contrast, as shown in FIG. 14, since the width of the coloring temperature range is set narrower, it is easy to visually recognize that the power supply adaptor 112 is higher in temperature than the power supply adaptor 111. That is, it is easier to visually distinguish the temperature difference (difference in color) between the power supply adaptor 111 and the power supply adaptor 112.

The setting of the width of the coloring temperature range is started by pressing a coloring temperature width adjustment button B12. That is, when the coloring temperature width adjustment button B12 is pressed in the state shown in FIG. 13, a slider S10, which is a user interface (UI) to set the width of the coloring temperature range, is displayed below the thermal image M2 and the visible image M1 as shown in FIG. 14. By sliding a knob S2 and a knob S3 on the slider S10, the width of the coloring temperature range can be set. A distance between the knob S2 and the knob S3 corresponds to the width of the coloring temperature range to be set.

Further, positions of the knob S2 and the knob S3 respectively correspond to the lower limit value Tmin and the upper limit value Tmax of the coloring temperature range.

Figure 15:
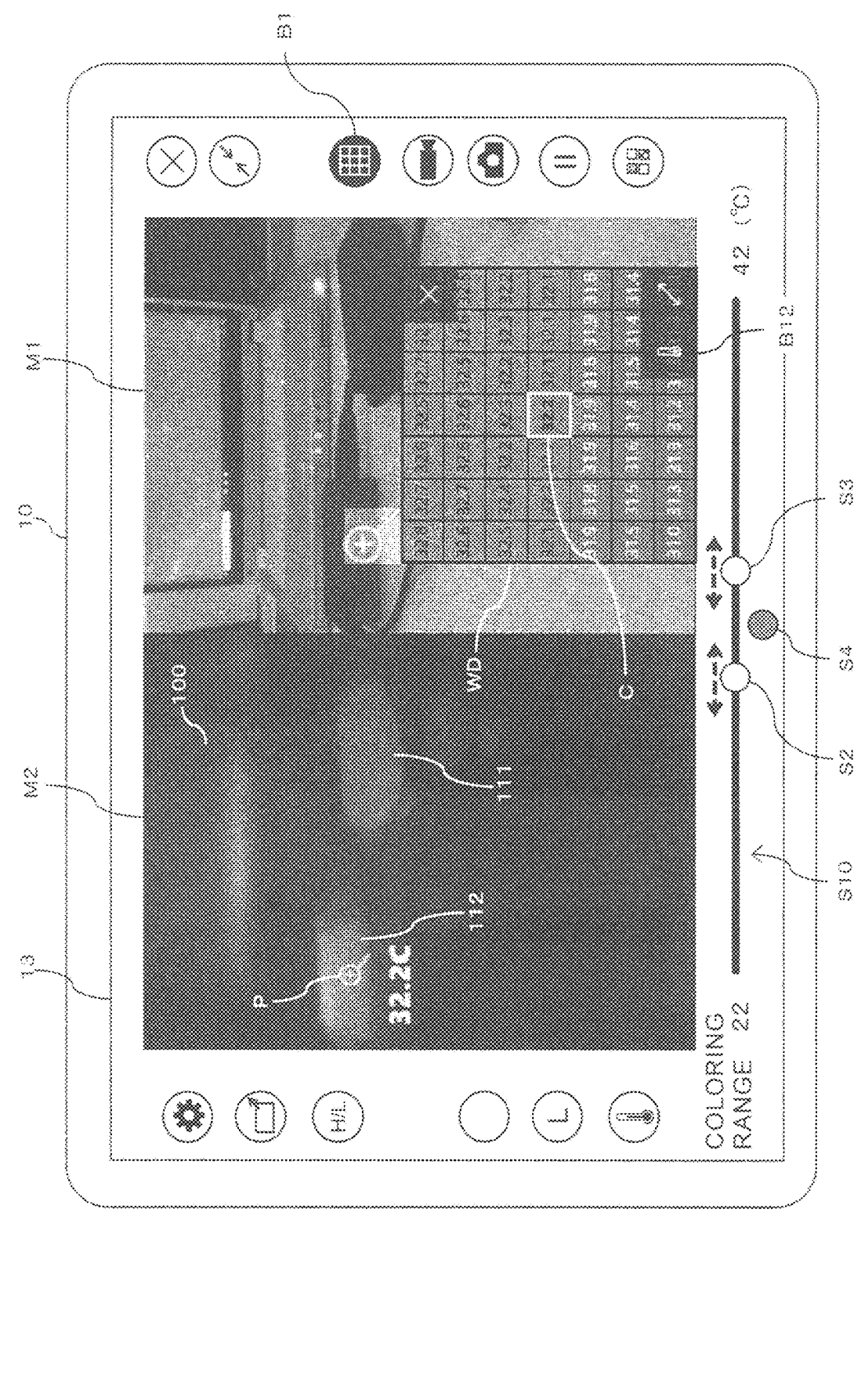
FIG. 15 is a user interface (UI) to change the coloring temperature range.

Therefore, as shown in FIG. 15, it is also possible to fine-tune the lower limit and the upper limit of the coloring temperature range by sliding the knob S2 and the knob S3, respectively. Further, by sliding a knob S4, it is possible to slide the coloring temperature range while keeping a coloring temperature width between the knobs S2 and S3. At this time, the coloring temperature range is set to a range of ±W/2 of the temperature of the pixel corresponding to the position of the pointer P.

a) How to Change Coloring Temperature Range by Changing Boundary Values

Figure 16:
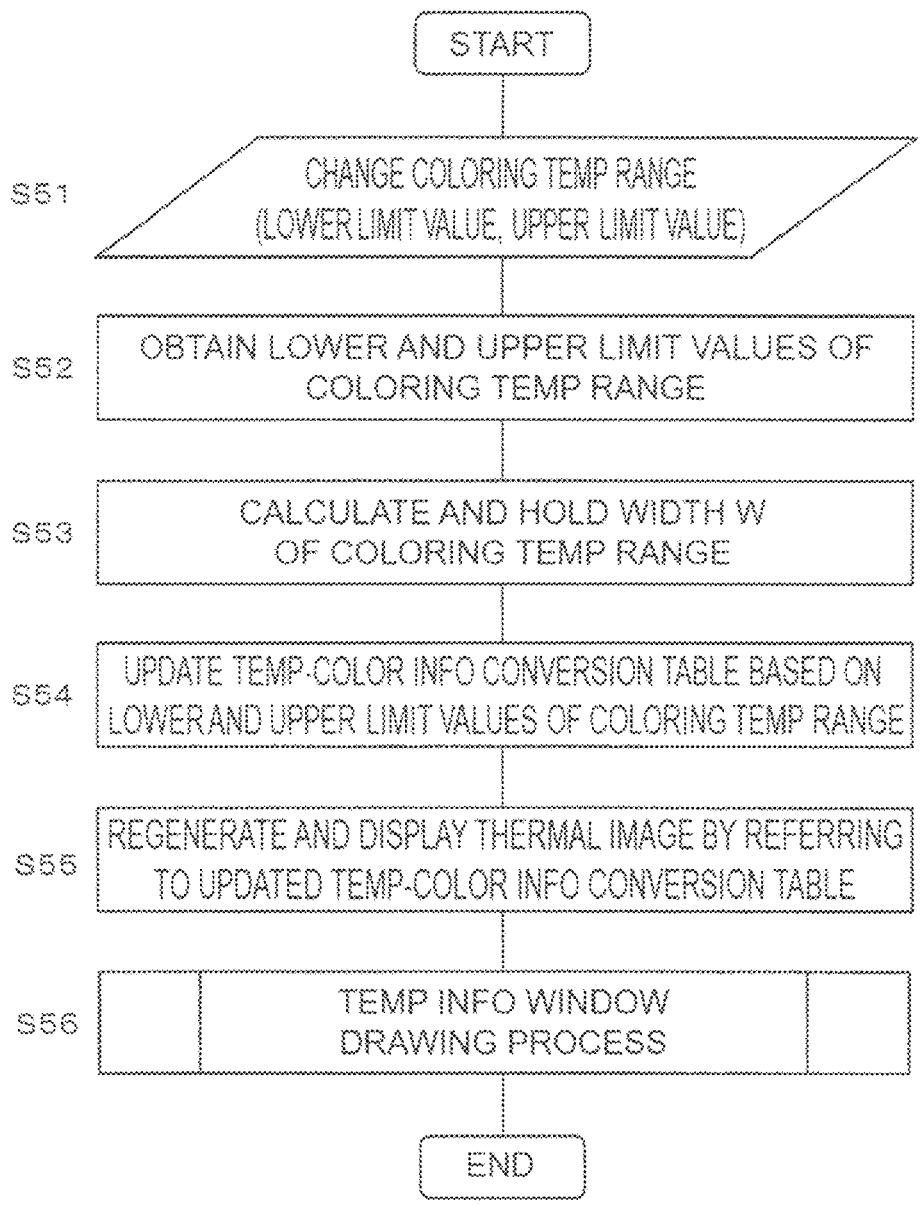
FIG. 16 is a flowchart showing a process for changing the coloring temperature range on the basis of set boundary values.

FIG. 16 is a flowchart showing a process performed when the boundary values (the lower limit value Tmin, the upper limit value Tmax) are changed by the operation of the slider S10, in other words, when the width (W) of the coloring temperature range is changed. In the following, an operation shown in the flowchart of FIG. 16 will be described.

The controller 11 determines whether an operation to change the coloring temperature range is performed by a user (step S51). In other words, the controller 11 determines whether the user operates the knob S2, S3 of the slider S10.

When the controller 11 detects that the operation to change the coloring temperature range (that is, the lower limit value Tmin, the upper limit value Tmax) is performed, the controller 11 obtains the lower limit value Tmin and the upper limit value Tmax of the set coloring temperature range (step S52).

The controller 11 calculates the width W of the coloring temperature range from the lower limit value and upper limit value of the set coloring temperature range, and stores the width W of the coloring temperature range in the data storage 16 (step S53).

The controller 11 updates the temperature-color information conversion table 16b on the basis of the lower limit value and upper limit value of the set coloring temperature range (step S54). Specifically, each temperature having a value between the lower limit value and upper limit value of the set coloring temperature range is converted into color information by using a previously prepared 256 gradation palette, so that the temperature-color information conversion table 16b is updated.

Further, the controller 11 refers to the updated temperature-color information conversion table 16b to regenerate and display the thermal image M2 (step S55). Further, the controller 11 performs the temperature information window drawing process to regenerate the temperature information window WD and display the temperature information window WD on the display 13 (step S56).

Figure 17:
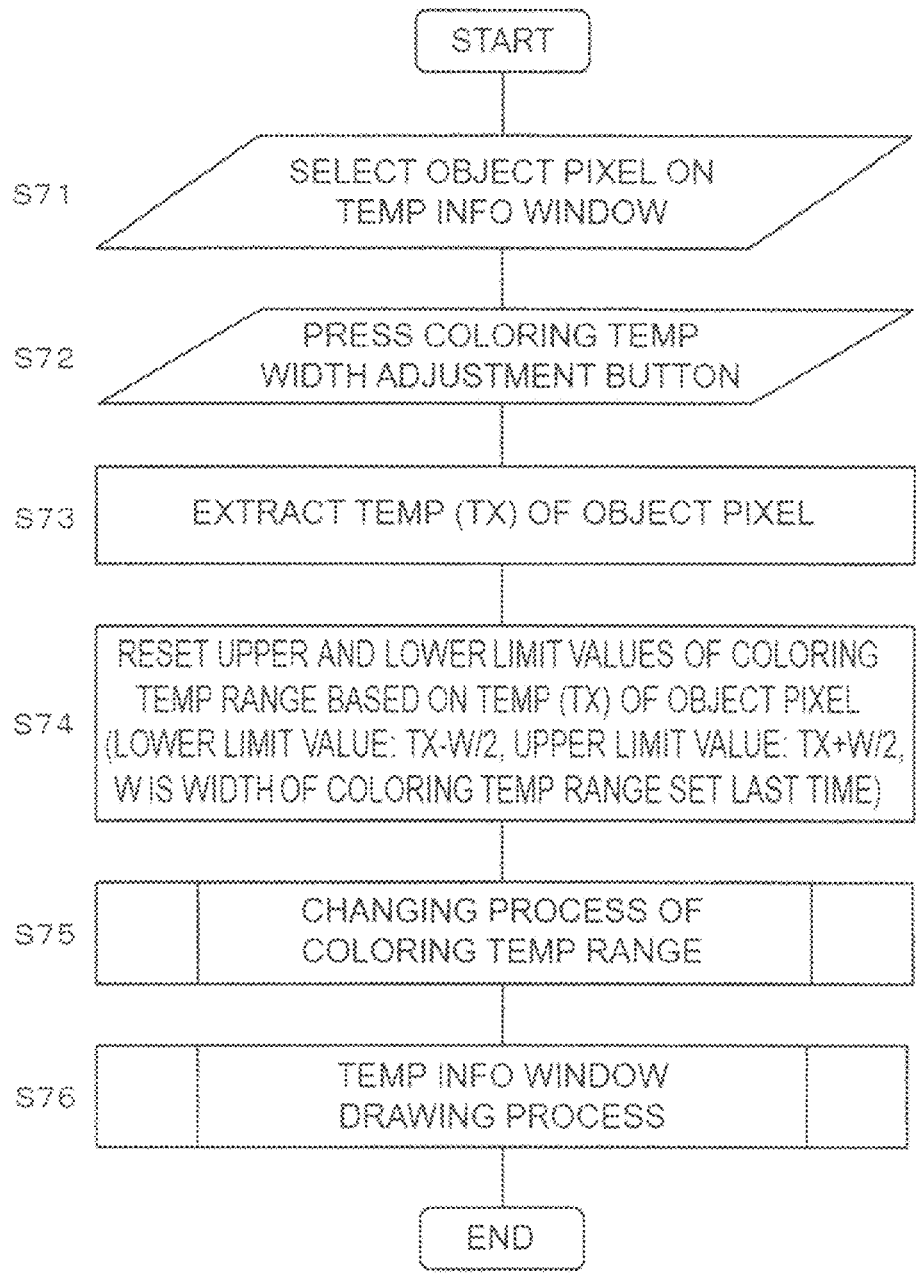
FIG. 17 is a flowchart showing a process for changing the coloring temperature range by using temperature of a specified object pixel as a reference.

In this way, the user can arbitrarily set the width of the coloring temperature range and boundaries of the coloring temperature range.

b) How to Change Coloring Temperature Range by Using Object Pixel as a Reference In the information processing device 10 of the present embodiment, it is possible to change the coloring temperature range by using as a reference a temperature of one pixel (that is, a rectangular area), on the temperature information window WD, specified by the user. FIG. 17 is a flowchart showing a process for changing the coloring temperature range by using as a reference the temperature of the pixel specified by the user.

The controller 11 waits for an object pixel (that is, a rectangular area), which should be a reference for temperature display, to be specified on the temperature information window WD by the user (step S71). For example, the user specifies the object pixel by touching one pixel (rectangular area) on the temperature information window WD. Note that the object pixel does not necessarily have to be specified by the user. When the user does not specify the object pixel, the pixel (rectangular area) C at the center of the temperature information window WD may be set as the object pixel.

When the object pixel is specified on the temperature information window WD by the user, the controller 11 determines whether the coloring temperature width adjustment button B12 is pressed (step S72).

When the coloring temperature width adjustment button B12 is pressed, the controller 11 extracts a temperature Tx of the object pixel (step S73). Then, the controller 11 resets the lower limit value Tmin and the upper limit value Tmax of the coloring temperature range by the following equations on the basis of the temperature Tx of the object pixel (step S74).

$$\text{Lower limit value } T\text{min of coloring temperature range} = Tx - W/2 \quad \text{(Equation 2a)}$$

$$\text{Upper limit value } T\text{max of coloring temperature range} = Tx + W/2 \quad \text{(Equation 2b)}$$

As the value of the width W of the coloring temperature range in the above equations, the value of the width W stored in the data storage 16 is used.

After that, in accordance with the flowchart shown in FIG. 16, the controller 11 performs the changing process of the coloring temperature range (step S75). By this process, based on the lower limit value Tmin and the upper limit value Tmax of the reset coloring temperature range, the temperature-color information conversion table 16b is updated. Further, the thermal image M2 is newly generated and displayed.

Subsequently, in accordance with the flowcharts shown in FIGS. 6 and 7, the controller 11 newly generates the temperature information window WD and causes the display 13 to display the temperature information window WD (step S76).

In this way, the coloring temperature range is set by using as a reference the temperature of the object pixel specified by the user.

As described above, in the information processing device 10 of the present embodiment, the user can arbitrarily set the width of the coloring temperature range and the center of the coloring temperature range. The user can improve visibility of a temperature of an inspection object by setting the coloring temperature range depending on conditions of the inspection object as appropriate.

[1-3. Advantageous Effects]

As described above, the information processing device 10 of the present embodiment is an example of an image display device that displays the thermal image M2 that is captured by the infrared camera 19 and indicates temperatures of a subject by color. The information processing device 10 includes: a display 13 configured to display a thermal image M2; a data storage 16 configured to store temperature-color conversion information 16b representing a correspondence relation between temperatures of the subject and colors of a pixel; a touch panel 15 configured to receive an operation of a user; and a controller 11 configured to, according to the operation of the user, generate the thermal image M2 based on the temperature-color conversion information 16b and cause the display 13 to display the thermal image M2.

The controller 11 is configured to, when a position on the thermal image M2 is specified by the user, generate a temperature information window WD indicating, by a numerical value, a temperature of each pixel contained in a predetermined area containing the position specified on the thermal image M2, and cause the display 13 to display the temperature information window WD while a temperature of a pixel corresponding to the position specified is displayed at a center C of the temperature information window WD.

Further, the controller 11 is configured to, when a position on the temperature information window WD is specified by the user, set a temperature range (from T−w/2 to T+w/2) that has a predetermined temperature width (W) and a center which is a temperature (T) of a pixel corresponding to the position specified on the temperature information window WD, update the temperature-color conversion information 16b based on the temperature range, regenerate the thermal image M2 and the temperature information window WD based on the temperature-color conversion information 16b updated, and cause the display 13 to display the thermal image M2 and the temperature information window WD which are regenerated.

By the above configuration, the temperatures of the predetermined area centered at the temperature of the pixel corresponding to the position specified on the thermal image M2 by the user are displayed in gradation. This operation makes it easier to recognize the temperature difference between a heat source that the user wants to check and a heat source in the surrounding area. That is, a simple operation makes it possible for the user to visually recognize the temperature information of the heat source that the user wants to check and the heat source in the surrounding area more easily.

Further, in the above embodiment, there is disclosed an image display method that causes a display 13 to display a thermal image that indicates temperature information of a subject by color. The image display method includes generating a thermal image indicating temperatures of the subject by color based on a temperature-color information conversion table 16b representing a correspondence relation between temperatures of the subject and colors of a pixel, and displaying the thermal image on a display 13.

Further, the image display method includes generating, when a position on the thermal image is specified by a user, a temperature information window WD that indicates, by a numerical value, a temperature of each pixel contained in a predetermined area containing the position specified on the thermal image, and displaying the temperature information window WD on the display 13 while displaying, at a center C of the temperature information window WD, a temperature of a pixel corresponding to the specified position.

Further, the image display method includes: setting, when a position on the temperature information window WD is specified by the user, a temperature range (from T−w/2 to T+w/2) that has a predetermined temperature width (W) and a center which is a temperature (T) of a pixel corresponding to the position specified on the temperature information window WD; updating the temperature-color information conversion table 16b based on the temperature range; regenerating the thermal image M2 and the temperature information window WD based on the temperature-color information conversion table 16b updated; and displaying, on the display 13, the thermal image M2 and the temperature information window WD which are regenerated.

Other Embodiments

The first embodiment is described in the above as an example of the technique disclosed in the present application. However, the technique of the present disclosure can be applied not only to the above embodiment but also to an embodiment in which modification, replacement, addition, or removal is appropriately made. Further, it is possible to form a new embodiment by combining the components described in the first embodiment. Therefore, other embodiments will be exemplified below.

In the first embodiment, the description is given using a tablet terminal as an example of the information processing device; however, the ideas of the present disclosure can also be applied to other electronic equipment. For example, the present disclosure can also be applied to electronic equipment such as smartphones, laptop PCs, and desktop PCs.

The pixel number and the value of gradation number described in the above embodiment are examples and are not limited to the above-mentioned values.

The thermal image display application 16a and the temperature-color information conversion table 16b may be installed in the information processing device 10 from a portable non-transitory recording medium such as an optical disc or a memory card, or may be downloaded from a server via a network.

In the first embodiment, the temperatures of the pixels in a surrounding area of the position specified by the pointer P on the thermal image M2 of FIG. 3 are displayed in the temperature information window WD on FIG. 4. In a case where it is required to display the temperatures of the whole object, the following procedure may be used. The mode enters an area specifying mode after the button B2 of FIG. 18 is pressed. Then, the user specifies an arbitrary area by handwriting input on the thermal image M2, and an average temperature of the pixels surrounded by the area Ar1 is displayed as T.

Further, the following operation may be used. When the button A1 on FIG. 18 is pressed, the width between the minimum temperature and the maximum temperature in the corresponding area is used as the width W in FIG. 12, and the width of the coloring temperature is set to the temperature range in the area. This operation makes it possible to set such colors that further clarify the temperature distribution in the object. Alternatively, by the button A1 being pressed, the average temperature in the corresponding area may be used as Tp in FIG. 12.

In the above, the embodiment is described as an example of the technique in the present disclosure. For that purpose, the accompanying drawings and the detailed description are provided.

Therefore, the components illustrated in the accompanying drawings and described in the detailed description not only include components essential for solving the problem but also can include, to exemplify the technique, components not essential for solving the problem. For this reason, it should not be immediately recognized that those unnecessary components are necessary only because those unnecessary components are described in the accompanying drawings and the detailed description.

In the present specification, steps that describe a program stored in a non-transitory recording medium include, of course, processes that are performed on a time-series basis, but the steps also include processes that do not have to be performed on a time-series basis but are performed parallelly or individually.

In addition, because the above embodiments are for illustrating the technique in the present disclosure, various modifications, replacements, additions, removals, or the like can be made without departing from the scope of the claims or the equivalent thereto.

The image display device of the present disclosure makes it possible to provide users with temperature information of an object in an intuitionally recognizable manner. As a result, the image display device of the present disclosure is useful for a device that provides users with temperature information of an object.

The invention claimed is:

1. An image display device that displays a thermal image that is captured by an infrared camera and indicates temperatures of a subject by color, the image display device comprising:
    a display configured to display the thermal image;
    a storage configured to store temperature-color conversion information representing a correspondence relation between temperatures of the subject and colors of a pixel;
    an operation device configured to receive an operation of a user; and
    a control circuit configured to, according to the operation of the user, generate the thermal image based on the temperature-color conversion information and cause the display to display the thermal image,
    wherein, the control circuit is configured to, when a position on the thermal image is specified by the user, generate a temperature information image indicating, by a numerical value, a temperature of each pixel contained in a predetermined area including the position specified on the thermal image, and cause the display to display the temperature information image while a temperature of a pixel corresponding to the position specified is displayed at a center of the temperature information image, and
    the control circuit is configured to, when a position on the temperature information image is specified by the user, set a temperature range that has a predetermined temperature width and a center which is a temperature of a pixel corresponding to the position specified on the temperature information image, update the temperature-color conversion information based on the temperature range, regenerate the thermal image and the temperature information image based on the temperature-color conversion information updated, and cause the display to display the thermal image and the temperature information image which are regenerated.

2. The image display device according to claim 1, wherein the operation device includes a user interface configured to set the temperature width.

3. The image display device according to claim 1, wherein the temperature information image has rectangular areas that are two-dimensionally arranged in correspondence to pixels in a partial area of the thermal image,
    a numerical value representing a temperature is disposed in each of the rectangular areas, and
    a background color of each of the rectangular areas is set based on a temperature of said each of the rectangular areas and the temperature-color conversion information.

4. The image display device according to claim 1, wherein the display is configured to further display a visible image side by side to the thermal image, the visible image being generated by capturing with visible light a same subject as the thermal image.

5. The image display device according to claim 4, further comprising:
    a first camera configured to capture the visible image; and
    a second camera configured to capture the thermal image.

6. The image display device according to claim 1, wherein the operation device is a touch panel.

7. The image display device according to claim 1, wherein the image display device is a tablet terminal.

8. An image display method that causes a display device to display a thermal image that indicates temperature information of a subject by color, the method comprising:
generating a thermal image indicating temperatures of the subject by color based on temperature-color conversion information representing a correspondence relation between temperatures of the subject and colors of a pixel, and displaying the thermal image on a display;
generating, when a position on the thermal image is specified by a user, a temperature information image that indicates, by a numerical value, a temperature of each pixel contained in a predetermined area containing the position specified on the thermal image, and displaying the temperature information image on the display while displaying, at a center of the temperature information image, a temperature of a pixel corresponding to the position specified;
setting, when a position on the temperature information image is further specified by the user, a temperature range that has a predetermined temperature width and a center which is a temperature of a pixel corresponding to the position specified on the temperature information image;
updating the temperature-color conversion information based on the temperature range; and
regenerating the thermal image and the temperature information image based on the temperature-color conversion information updated, and displaying, on the display, the thermal image and the temperature information image which are regenerated.

9. The image display method according to claim 8, wherein the temperature width is set by the user.

10. The image display method according to claim 8, wherein the temperature information image has rectangular areas that are two-dimensionally arranged in correspondence to pixels in a partial area of the thermal image,
a numerical value representing a temperature is disposed in each of the rectangular areas, and
a background color of each of the rectangular areas is set based on a temperature of said each of the rectangular areas and the temperature-color conversion information.

11. The image display method according to claim 8, further comprising:
further displaying a visible image side by side to the thermal image, the visible image being generated by capturing with visible light a same subject as the thermal image.

* * * * *